July 2, 1940.　　　　G. E. MIRFIELD　　　　2,206,747
WELDING APPARATUS
Filed Dec. 14, 1937　　　3 Sheets-Sheet 1
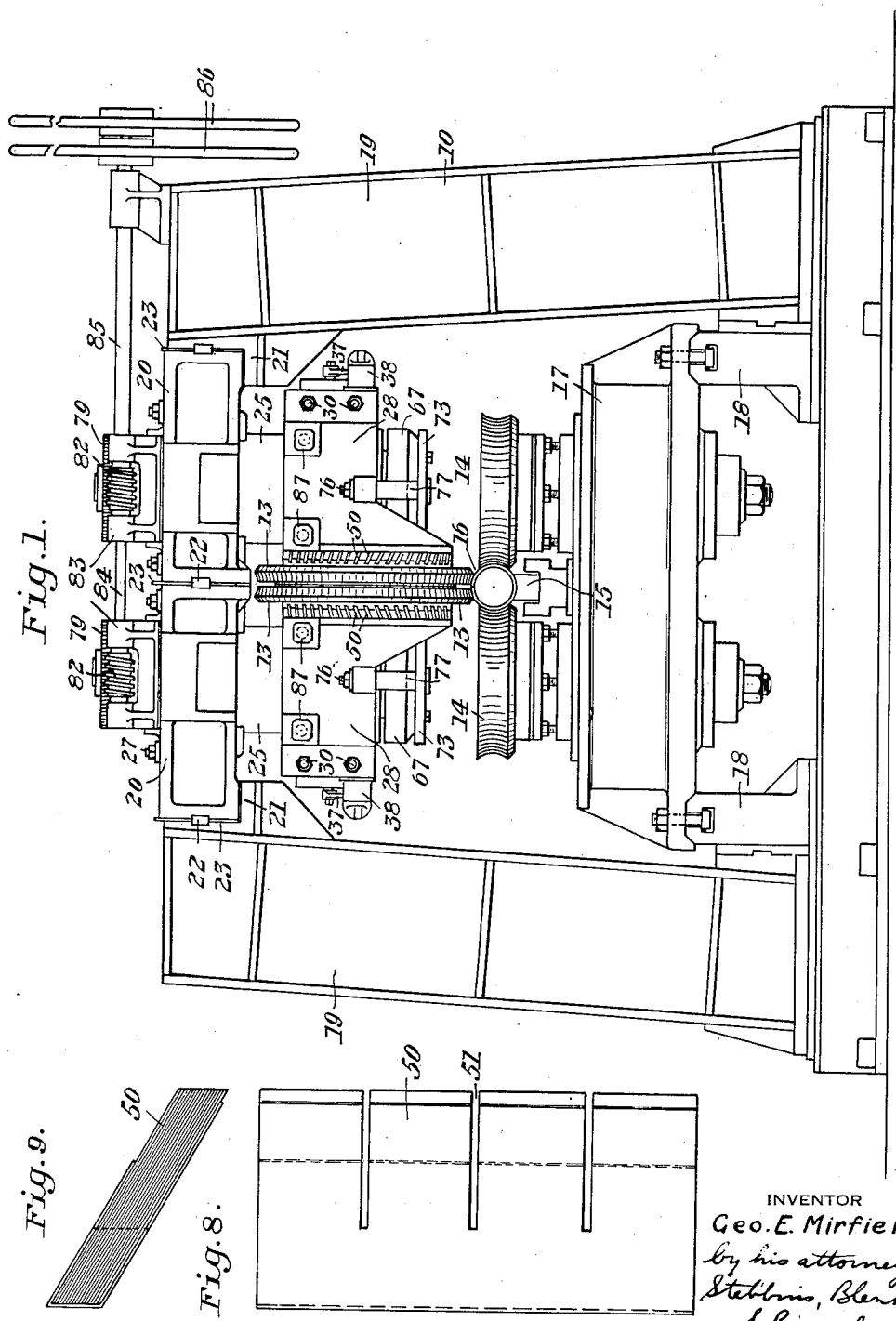
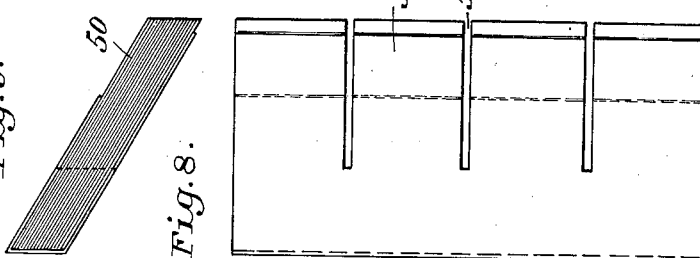
INVENTOR
Geo. E. Mirfield
by his attorneys
Stebbins, Blenko
& Parmelee

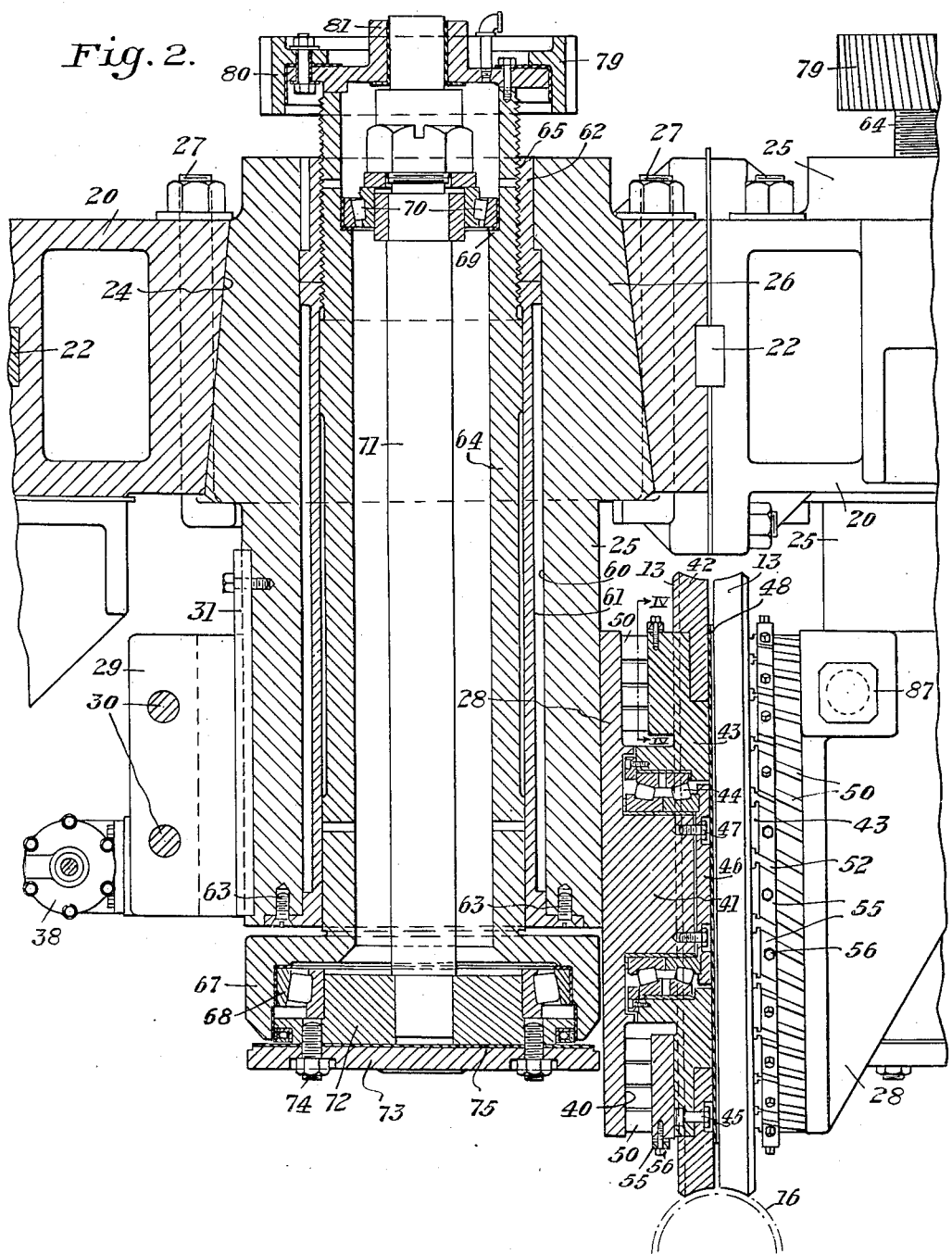

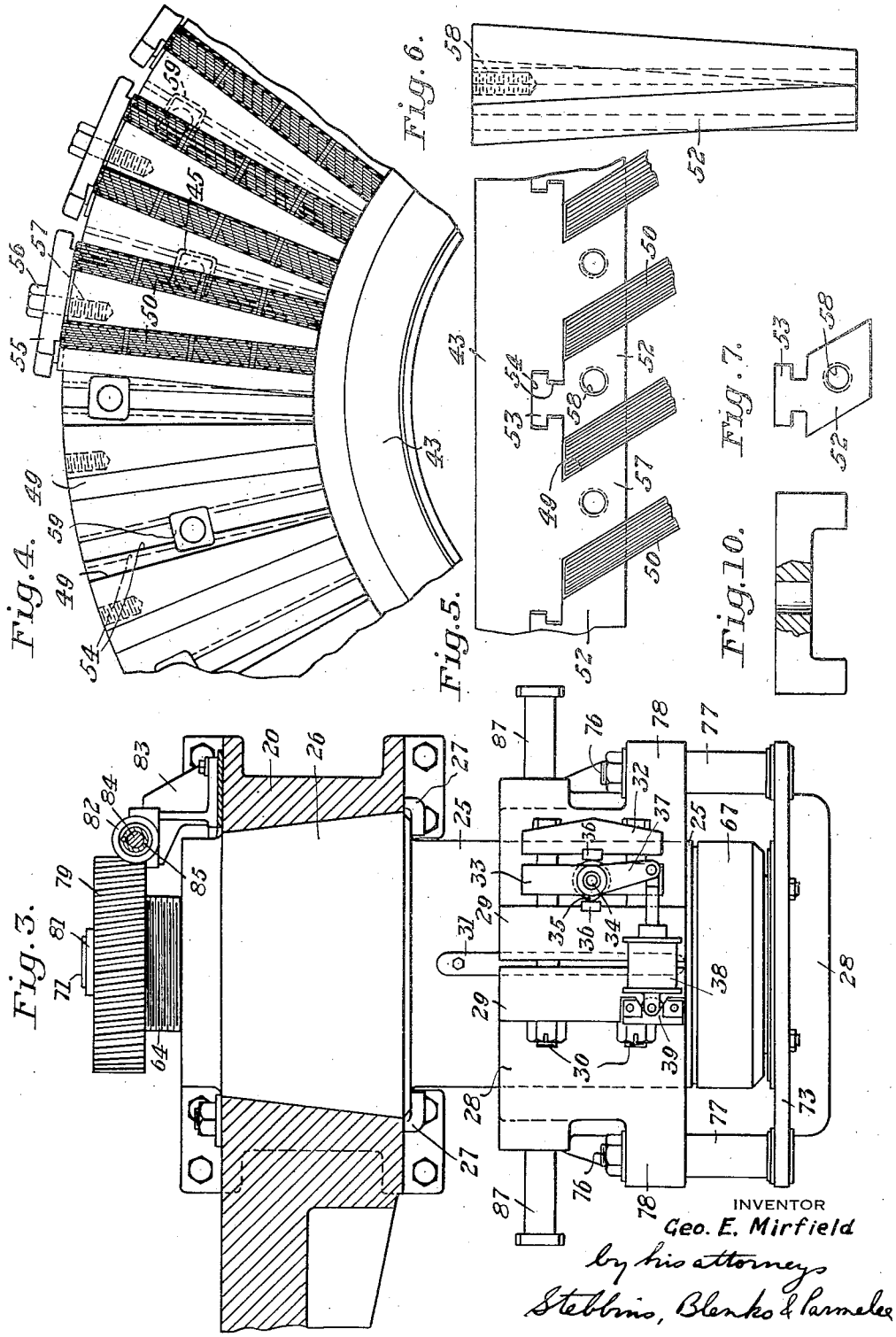

Patented July 2, 1940

2,206,747

UNITED STATES PATENT OFFICE 2,206,747

WELDING APPARATUS

George E. Mirfield, Youngstown, Ohio, assignor to Direct Current Welding Company, a corporation of Delaware Application December 14, 1937, Serial No. 179,737

14 Claims. (Cl. 219—6)

This invention relates to welding apparatus and particularly to apparatus adapted to unite the abutting edges of metallic members as they advance longitudinally, by the progressive electric resistance method of welding.

Various types of apparatus adapted to perform electric resistance welding operations have been proposed heretofore. The general object of my invention is to improve on such apparatus by providing a device of simple construction which is capable of easy adjustment to adapt it to work pieces of various sizes. It is also an object of the invention to provide means for supplying current to a rotating electrode of the disk type having progressive engagement with the work, with a minimum of energy loss, sparking and brush wear. A further object of my invention is to provide independently adjustable electrodes for engaging the abutting edges to be welded.

In accordance with the invention, a main supporting spindle is provided with a bracket slidable thereon. A boss projecting laterally from the bracket provides a bearing for an annular or disk electrode. A second electrode similarly constructed and supported completes the apparatus. By suitable means to be described hereinafter, the bracket may be moved along the spindle to adjust the position of the electrode proper.

A present preferred embodiment of the invention is illustrated in the accompanying drawings. This embodiment is particularly adapted for welding of a longitudinal seam in formed pipe lengths although the principles thereof may be incorporated in a machine for welding other types of work pieces.

In the drawings:

Figure 1 is an elevation with parts shown largely diagrammatically;

Figure 2 is a partial vertical transverse sectional view taken on an axial plane through the electrode with parts in elevation;

Figure 3 is a view partly in elevation such as would be seen by looking from the left in Figure 2, with parts in section;

Figure 4 is a partial sectional view along the line IV—IV of Figure 2 with parts omitted;

Figure 5 is a partial plan view corresponding to Figure 4;

Figure 6 is an elevation of a detail;

Figure 7 is a plan thereof;

Figure 8 is an elevation of one of the brushes associated with the electrodes;

Figure 9 is an edge view thereof; and

Figure 10 is an elevation of a detail.

Referring now in detail to the drawings, the invention comprises generally a frame 10, having supporting spindles 25 carried thereon, brackets 28 slidable on the spindles and electrodes 13 rotatably mounted on the brackets 28. The electrodes 13 cooperate with side pressure rolls 14 and a bottom support roll 15 to define a welding throat through which a work piece such as a formed pipe blank 16 is adapted to move. The side pressure rolls are similar to corresponding elements disclosed in my Patent No. 2,037,916 and the detailed construction thereof requires no further explanation here. It is sufficient to state that the side pressure rolls are journaled on vertical spindles mounted in a base casting 17 adjustably secured to supporting rails 18.

The frame 10 comprises side members 19 and a cross beam extending therebetween composed of box castings 20 resting on brackets 21. The castings 20 are fixed to each other and to the brackets 21 by keys 22 of insulating material such as micarta and are insulated from each other and from the brackets by insulation 23.

Referring now more particularly to Figures 2 and 3, each of the castings 20 is provided with a substantially vertical tapering bore 24. The spindles 25 have a tapering upper portion 26 adapted to seat in the bore 24 of each casting 20 and are suspended therefrom by hook bolts 27. The right and left spindles 25 and the mechanism mounted thereon are identical. The description, therefore, will refer hereafter to only one unit.

The split bracket 28 is slidable on the spindle 25 and has ears 29 through which clamping bolts 30 extend whereby the bracket may be contracted about the spindle to lock it firmly thereto. A key 31 secured to the spindle and received in a key-way in the bracket 28 prevents rotation of the bracket on spindle.

The clamping bolts are connected by a crosshead 32. A cam block 33 slidably mounted on the bolts 30 is provided with a cam shaft 34. A cam 35 on the shaft 34 is adapted to engage bearing blocks 36, one on the right hand ear 29 as seen in Figure 3 and the other on the crosshead 32.

For actuating the cam shaft 34, a crank 37 is keyed thereto. A fluid pressure cylinder 38 is pivoted to a bearing bracket 39 secured to the left hand ear 29. A piston in the cylinder is pivoted to crank 37. It will be apparent that the crank 37 may be shifted through a sufficient angle by the fluid pressure cylinder and piston to actuate the cam 35 and thereby cause contraction of the bracket about the spindle 25.

The bracket 28 is provided, opposite the ears 29, with a plane bearing face 40. A boss 41 projecting laterally from the bracket and perpendicular to the plane of the face 40 provides a support for one of the electrodes 13. As best shown in Figure 2, each electrode comprises an annular contact rim 42 and an inner ring or hub portion 43. The latter is journaled on the boss 41 on roller bearings 44. The rim 42 is secured to the periphery of the hub portion 43 by bolts 45. The inner races of the bearings 44 are held in position by a cover plate 46 secured to the boss 41 by screws 47. An insulating disk 48 is secured to the left hand electrode 13. In addition, the right hand electrode 13 is spaced slightly from the surface of the insulating disk.

The hub portion 43 of the electrode has substantially radial slots 49 therein adapted to receive brushes 50. The brushes are laminated, being composed of highly conducting thin sheet metal. For greater flexibility, the laminations are split at 51, as shown in Figure 8. The side walls of the slots 49 are not parallel to the axis of electrode but inclined thereto so that, as shown in Figures 1, 2 and 5, the brushes are inclined to the plane of the face 40 of the bracket 28. Each pair of brushes is held in position by a wedge 52 as clearly shown in Figures 4 and 5. Figures 6 and 7 show the construction of the wedge itself. The wedge has a T head 53 and the hub 43 is provided with radial slots 54 opening into the slots 49 and adapted to receive the T heads of the wedges. Clamps 55 are secured to the periphery of the hub portion 43 to hold the brushes and wedges in position. Screws 56 threaded into holes 57 in the lugs or teeth between adjacent slots 49 hold the clamps in position. Tapped holes 58 in the wedges 52 permit the latter to be withdrawn by means of a screw passed through a hole in a U shaped wedge pull-out member shown in Figure 10.

The slots 49 have square recesses 59 therein in which the heads of the bolts 45 are seated. As stated before, these bolts hold the rim 42 of the electrode on the hub 43.

Connections for supplying welding current to the electrodes may be made as disclosed in my prior patent above referred to or in any other convenient manner. It will be apparent that current flowing through the spindle 25 to the point on the periphery of the rim 42 which is in engagement with the blank will be concentrated in the brushes 50 nearest the point of contact. Because of the rotation of the electrodes, each brush conducts its share of the total welding current for only a small portion of each electrode revolution. This prevents overheating and excessive wear, and at the same time, permits a higher current density in the brushes than would otherwise be possible.

It is desirable to adjust the electrodes to and from the work both for the purpose of adapting them to different sizes of the latter and to insure the desired contact pressure at all times. I provide means for adjusting each electrode vertically on its spindle 25, independently of the other electrodes.

As shown in Figure 2, the spindle 25 has an axial bore 60 therethrough. A sleeve 61 and a collar 62 are positioned in the bore 60, the former being secured to the spindle by screws 63 and the latter by a key. An inner sleeve 64 is threaded into the collar 62 and the sleeve 61 at 65.

The lower end of the inner sleeve 64 is enlarged at 67 to provide a seat for a bearing 68. A shoulder 69 near the upper end of the sleeve 64 provides a seat for bearing 70. A shaft 71 is journaled near its upper end in the bearings 70. A disk 72 secured to the lower end of the shaft 71 is journaled in the bearing 68.

A bottom plate 73 is secured to the disk 72 by stud bolts 74 and separated therefrom by insulation 75. The bearings 68 and 70 are insulated from the sleeve 64 as shown.

Bolts 76 extend upwardly from opposite ends of the bottom plate 73 and, by means of spacer sleeves 77 thereon, support the bracket 28. The bolts 76 pass through lugs 78 on the bracket and these lugs engage the tops of the spacer sleeves 77.

Since the bracket 28 is prevented from rotating by the key 31, the plate 73 is similarly held against rotation because it is connected to the bracket through the bolts 76. The disk 72 and shaft 71 are, therefore, non-rotatable. The inner sleeve 64, however, is rotatable in the sleeve 61 and collar 62 and about the shaft 71 and disk 72 by reason of the bearings 68 and 70. When it is desired to adjust one of the electrodes on its spindle it is only necessary to release the clamping mechanism on the bracket 28 by admitting fluid under pressure to the proper end of the cylinder 36, and then to rotate the sleeve 64. Because of the threaded engagement of the latter with the sleeve 61 and collar 62, vertical adjustment thereof is effected on rotation.

To facilitate rotation of the sleeve 64 for vertical adjustment of the electrode, a worm wheel 79 is secured to the upper end of the sleeve 64. The worm wheel 79 is composed of a rim 80 and hub 81 insulated from each other. The hub 81, furthermore, is insulated from the upper end of the shaft 71. Worms 82 are journaled in bearings 83 carried on the castings 20 and insulated therefrom. The worms mesh with worm wheels 79 of the two electrodes. The worm wheels are secured to co-axial shafts 84 and 85, respectively, the latter being hollow. Hand wheels 86 are provided for manual operation of the shafts 84 and 85.

It will be clear from the foregoing description that the invention provides a welding apparatus characterized by numerous advantages over similar apparatus known heretofore. In the first place, the apparatus of my invention is relatively simple and provides a highly convenient means for supporting and adjusting twin disk electrodes mounted for rotation about horizontal axes. The electrodes are firmly held in proper position during welding but may be easily released for adjusting movement. Either electrode and its supporting bracket may be removed from its spindle merely by removing the nuts from stud bolts 74. Pins 87 threaded into the brackets provide trunnions facilitating handling of the brackets when removed from their spindles.

The arrangement of the brushes on the electrodes reduces the wear thereof to a minimum. Instead of requiring replacement within a relatively short time such as one month, which has been necessary with prior welding machines, the brushes of my apparatus serve for many times that period without evidence of substantial wear.

Capability of adjustment of either electrode independent of the other is important because it is frequently found in the operation of welding apparatus of this character that overheating or burning of the work occurs on one side of the seam only. This is corrected by adjustment of the electrode on that side but would not be cured if both electrodes moved together.

A further advantage of the structure disclosed is that good electrical contact between the electrode-supporting brackets and their spindles is maintained by the tightening of the clamping bolts 30, in spite of wear of the bearing surfaces or pitting thereof which might result from the heavy currents passing thereacross. Such effects would cause poor contact if a force fit of the parts were employed.

Although I have illustrated and described herein but a preferred embodiment of the invention, it will be understood that changes in the apparatus disclosed may be made without departing from the spirit of the invention or the scope of the appended claims.

I claim:

1. Welding apparatus comprising a frame, a spindle mounted thereon, a bracket slidable on said spindle, means extending through said spindle for adjusting the bracket thereon, a boss projecting laterally from said bracket, and a disk electrode rotatably mounted on said boss.

2. In a welding apparatus, a spindle, a bracket slidable thereon, a boss extending laterally from the bracket, a disk electrode rotatably mounted on said boss, means extending through the spindle for adjusting the bracket along the spindle and means for securing the bracket to the spindle in adjusted position thereon.

3. In a welding apparatus, the combination with a spindle, a bracket slidable thereon, a boss extending laterally from the bracket and a disk electrode rotatably mounted on said boss, of a sleeve extending through said spindle and adjustable axially thereof, and means depending from said sleeve for positioning said bracket on said spindle.

4. In a welding apparatus, the combination with a spindle, a bracket slidable thereon, a boss extending laterally from the bracket and a disk electrode rotatably mounted on said boss, of a sleeve extending through said spindle and threaded thereinto, a plate suspended from said sleeve, said sleeve being rotatable relative to said plate, and means on said plate for supporting said bracket.

5. In a welding apparatus, the combination with a spindle, a bracket slidable thereon, a boss extending laterally from the bracket and a disk electrode rotatably mounted on said boss, of a sleeve extending through said spindle and threaded thereinto, a shaft journaled co-axially in said sleeve, a plate suspended on said shaft, and means carried on said plate for supporting said bracket.

6. A welding electrode comprising a disk mounted for rotation, substantially radial slots formed in one face of the disk, brushes positioned in said slots, and wedges in said slots effective to hold said brushes in position.

7. A welding electrode comprising a disk mounted for rotation, substantially radial slots formed in one face of the disk, brushes positioned in said slots, wedges in said slots effective to hold said brushes in position and clamps disposed peripherally of said disk for holding said brushes and wedges in position.

8. A welding electrode comprising a disk mounted for rotation and having a substantially plane contact face, substantially radial slots formed in said face of the disk, brushes positioned in said slots, said brushes being inclined to the plane of said face, and means for holding the brushes in position.

9. Welding apparatus comprising a frame, a spindle mounted thereon, a bracket slidable on said spindle, a sleeve extending through said spindle and threaded therein, means carried on the sleeve for positioning the bracket vertically on said spindle, a boss projecting laterally from said bracket, and a disk electrode rotatably mounted on said boss.

10. Welding apparatus comprising a frame, a spindle mounted thereon, a bracket slidable on said spindle, means extending through the spindle for adjusting the bracket along the spindle, means for contracting the bracket about the spindle in adjusted position, a boss projecting laterally from said bracket, and a disk electrode rotatably mounted on said boss.

11. Welding apparatus comprising a frame, a spindle mounted thereon, a current supply connection in contact with the spindle, a split clamping bracket carried by and adjustable along said spindle, means on said bracket for contracting it about the spindle, a boss projecting laterally from said bracket, a plane contact surface on said bracket surrounding said boss and normal thereto, a disk electrode rotatably mounted on said boss, and contact means on said electrode engaging said surface.

12. Welding apparatus comprising a frame, a spindle mounted thereon, a current-supply connection secured to the spindle, a bracket slidable on said spindle, means for tightly clamping said bracket on the spindle to permit current flow from the spindle to the bracket, a boss formed on and projecting laterally from said bracket, a plane contact surface on the bracket surrounding said boss and normal to the axis thereof, a disk electrode rotatably mounted on said boss, and brushes engaging said surface and electrode.

13. In a welding apparatus, a spindle, a current-supply connection secured to the spindle, a bracket secured on the spindle in current carrying relation relative thereto intermediate the ends thereof, a boss extending laterally from the bracket, a disk electrode rotatably mounted on said boss, a plane contact surface on said bracket adjacent said electrode, said surface surrounding said boss and being normal to the axis thereof, and means for transmitting current from the plane contact surface to the electrode.

14. In a welding apparatus, a frame, a spindle mounted therein, a pair of cooperating electrodes mounted side by side for rotation, means supporting one of said electrodes including a bracket slidable on the spindle and in current carrying relation relative thereto, a current-supply connection secured to said spindle, means for transmitting current from said bracket to said electrode, and means for adjusting said bracket and the electrode carried thereon independently of the other electrode.

GEORGE E. MIRFIELD.